United States Patent
Nagwanshi et al.

(10) Patent No.: US 8,876,179 B2
(45) Date of Patent: Nov. 4, 2014

(54) ENERGY ABSORBING ASSEMBLY AND METHODS OF MAKING AND USING THE SAME

(75) Inventors: Dhanendra Kumar Nagwanshi, Bangalore (IN); Poovanna Theethira Kushalappa, Bangalore (IN); Sudhakar Ramamoorthy Marur, Bangalore (IN)

(73) Assignee: Sabic Global Technologies B.V. (NL)

( * ) Notice: Subject to any disclaimer, the term of this patent is extended or adjusted under 35 U.S.C. 154(b) by 0 days.

(21) Appl. No.: 13/363,937

(22) Filed: Feb. 1, 2012

(65) Prior Publication Data

US 2013/0193698 A1    Aug. 1, 2013

(51) Int. Cl.
*B60R 19/03* (2006.01)
*B60R 19/22* (2006.01)

(52) U.S. Cl.
USPC ............................ 293/120; 188/371; 188/377

(58) Field of Classification Search
USPC .......... 293/120, 121, 122, 109; 188/371, 376, 188/377
See application file for complete search history.

(56) References Cited

U.S. PATENT DOCUMENTS

| | | | | |
|---|---|---|---|---|
| 3,666,310 A | * | 5/1972 | Burgess et al. | 293/109 |
| 4,072,334 A | * | 2/1978 | Seegmiller et al. | 293/110 |
| 4,427,189 A | * | 1/1984 | Kimura et al. | 267/139 |
| 4,457,547 A | * | 7/1984 | Sekiyama et al. | 293/110 |
| 4,533,166 A | | 8/1985 | Stokes | |
| 4,756,948 A | | 7/1988 | Kuramochi et al. | |
| 5,139,297 A | | 8/1992 | Carpenter et al. | |
| 5,265,925 A | * | 11/1993 | Cox et al. | 293/120 |
| 6,082,792 A | | 7/2000 | Evans et al. | |
| 6,213,540 B1 | * | 4/2001 | Tusim et al. | 296/187.02 |
| 6,406,081 B1 | | 6/2002 | Mahfet et al. | |
| 6,513,843 B1 | | 2/2003 | Frederick et al. | |
| 6,663,150 B1 | | 12/2003 | Evans | |
| 6,669,251 B2 | | 12/2003 | Trappe | |
| 6,672,635 B2 | | 1/2004 | Weissenborn et al. | |
| 6,726,262 B2 | | 4/2004 | Marijnissen et al. | |
| 6,866,313 B2 | | 3/2005 | Moojiman et al. | |
| 6,874,832 B2 | | 4/2005 | Evans et al. | |
| 6,923,494 B2 | | 8/2005 | Shuler et al. | |

(Continued)

FOREIGN PATENT DOCUMENTS

EP    0254530 A1    1/1988
WO    2011092342 A1    8/2011

OTHER PUBLICATIONS

International Publication No. 2011092342 (A1); Publication Date: Aug. 4, 2011; Abstract Only; 1 Page.

(Continued)

*Primary Examiner* — Dennis H Pedder
*Assistant Examiner* — Beverly Becker
(74) *Attorney, Agent, or Firm* — Cantor Colburn LLP

(57) ABSTRACT

In an embodiment, an energy absorbing assembly comprises a foam stage having a first surface and a second surface, wherein the second surface comprises a recess; and a thermoplastic stage comprising a frame and crush lobes; wherein the crush lobes extend from the frame of the thermoplastic stage into the recess. In another embodiment, a method of making an energy absorbing assembly comprises forming a foam stage having a first surface and a second surface, wherein the second surface comprises recesses; forming a thermoplastic stage having a frame and crush lobes protruding from the frame; and engaging the recesses and the crush lobes to form the energy absorbing assembly.

17 Claims, 8 Drawing Sheets

(56) References Cited

U.S. PATENT DOCUMENTS

| | | |
|---|---|---|
| 6,938,936 B2 | 9/2005 | Moojiman et al. |
| 6,971,690 B2 | 12/2005 | Evans et al. |
| 6,994,384 B2 | 2/2006 | Shuler et al. |
| 6,997,490 B2 | 2/2006 | Evans et al. |
| 7,044,515 B2 | 5/2006 | Moojiman et al. |
| 7,073,831 B2 | 7/2006 | Evans |
| 7,086,690 B2 | 8/2006 | Shuler et al. |
| 7,131,674 B2 | 11/2006 | Evans et al. |
| 7,134,700 B2 | 11/2006 | Evans |
| 7,147,258 B2 | 12/2006 | Evans et al. |
| 7,160,621 B2 | 1/2007 | Chaudhari et al. |
| 7,163,242 B2 | 1/2007 | Shuler et al. |
| 7,163,243 B2 * | 1/2007 | Evans ............ 293/121 |
| 7,188,876 B2 | 3/2007 | Jaarda et al. |
| 7,222,896 B2 | 5/2007 | Evans |
| 7,278,667 B2 | 10/2007 | Mohapatra et al. |
| 7,296,833 B2 | 11/2007 | Mohapatra et al. |
| 7,810,858 B2 * | 10/2010 | Frederick et al. ....... 293/120 |
| 7,992,905 B2 * | 8/2011 | Kusche et al. ............ 293/133 |
| 2002/0121787 A1 | 9/2002 | Tarahomi et al. |
| 2003/0067179 A1 | 4/2003 | Bastien et al. |
| 2004/0174025 A1 | 9/2004 | Converse et al. |
| 2006/0255602 A1 | 11/2006 | Evans |
| 2007/0114772 A1 | 5/2007 | Evans |
| 2007/0200376 A1 | 8/2007 | Jaarda et al. |
| 2008/0001416 A1 | 1/2008 | Chaudhari et al. |
| 2009/0045637 A1 | 2/2009 | Kusche et al. |
| 2011/0109105 A1 | 5/2011 | Ralston et al. |
| 2012/0286529 A1 * | 11/2012 | Gukkenberger et al. ..... 293/132 |

OTHER PUBLICATIONS

Written Opinion of the International Search Report for International Application No. PCT/IB2012/056775; International Filing Date Nov. 28, 2012; Date of Mailing Mar. 5, 2013; 7 pages.

International Search Report for International Application No. PCT/IB2012/056775; International Filing Date Nov. 28, 2012; Date of Mailing Mar. 5, 2013; 6 pages.

* cited by examiner

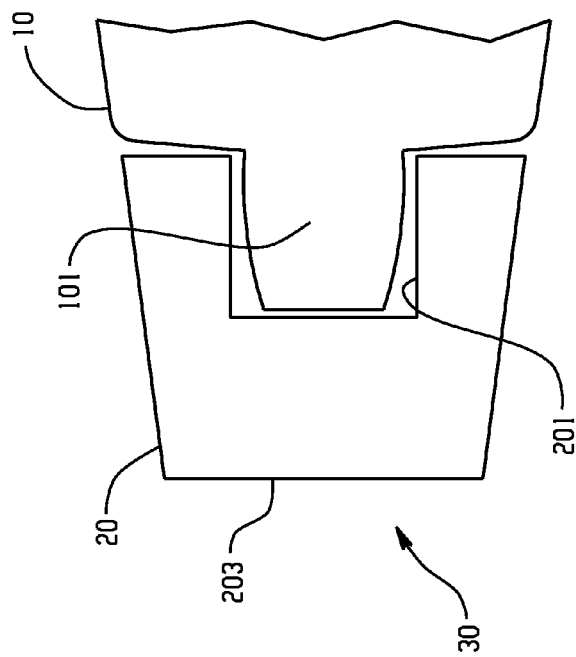
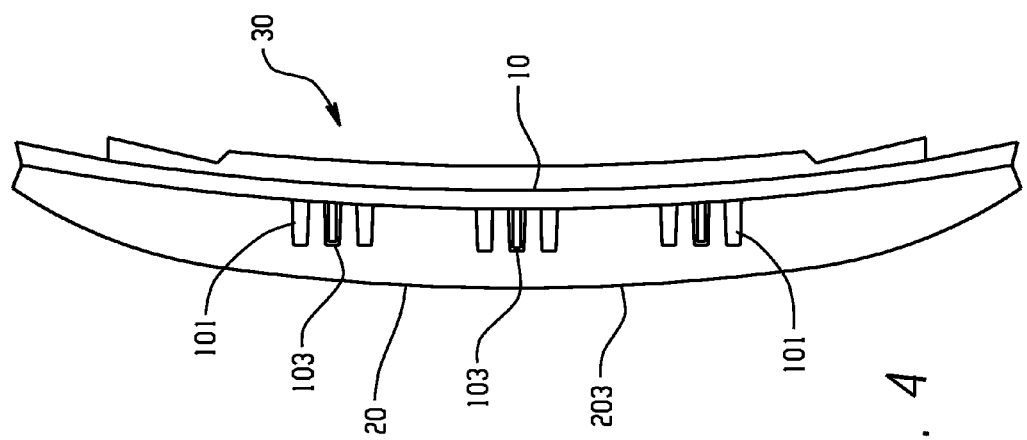

ENERGY ABSORBING ASSEMBLY AND METHODS OF MAKING AND USING THE SAME

TECHNICAL FIELD

The present disclosure relates generally to energy absorbers for use in a vehicle, for example, to reduce injuries (e.g., to occupant(s), pedestrian(s), etc.) and/or to reduce vehicle damage.

BACKGROUND

Modern vehicles have bumper systems tuned for particular energy absorption during a vehicle-to-vehicle impact. However, tuning of bumper systems can be challenging due to conflicting design requirements, such as limitations on the packaging space occupied by the bumper system (i.e., energy absorber and/or bumper beam), limitations on bumper beam flexure and rear intrusion into the space behind the bumper beam, and limitations on cost, quality, dimensional consistency and consistency/predictability of the impact energy-absorbing profile during the impact stroke itself. Recently, there has been increasing concern and subsequent regulations addressing pedestrian impacts in an effort to reduce pedestrian injury during such an impact. This has added a degree of difficulty and complexity in bumper system design and in bumper system tunability.

Besides safety concerns, repair costs of a vehicle suffering an impact and meeting both governmental and insurance test standards are also factors to consider in the design of vehicle parts such as bumper systems. Generally, vehicle parts such as bumper systems are designed to meet governmental test standards, such as low speed insurance tests, where the particular vehicle components can withstand low speed impact, e.g., at speeds of 4 to 15 kilometers per hour (kph) (2.5-9 miles per hour (mph)).

As an added complexity in the current competitive automotive market, combined with recent government directives on fuel efficiency, reducing the overall weight of the bumper systems can also be a challenge for design engineers to both reduce costs as well as increase fuel efficiency.

Previously, simultaneous low-cost and low weight systems could be attained only by a compromise in performance. Accordingly, a need has arisen to provide low weight and low cost energy absorbing systems that can meet strict and at times conflicting design constraints.

SUMMARY

Disclosed, in various embodiments, are energy absorbing assemblies, and methods for making and using the same.

In an embodiment, an energy absorbing assembly comprises: a foam stage having a first surface and a second surface, wherein the second surface comprises a recess; and a thermoplastic stage comprising a frame and crush lobes; wherein the crush lobes extend from the frame of the thermoplastic stage into the recess.

In an embodiment, a method of making an energy absorbing assembly comprises: forming a foam stage having a first surface and a second surface, wherein the second surface comprises recesses; forming a thermoplastic stage having a frame and crush lobes protruding from the frame; and engaging the recesses and the crush lobes to form the energy absorbing assembly.

In another embodiment, a vehicle comprises: an energy absorbing assembly, comprising a foam stage having a first surface and a second surface, wherein the second surface comprises a recess; and a thermoplastic stage comprising a frame and crush lobes; wherein the crush lobes extend from the frame of the thermoplastic stage into the recess; a fascia disposed over the first surface of the energy absorbing assembly; and a bumper beam, wherein the thermoplastic stage of the energy absorbing assembly is attached to the bumper beam.

These and other features are more particularly described below.

BRIEF DESCRIPTION OF THE DRAWINGS

The following is a brief description of the drawings wherein like elements are numbered alike and which are presented for the purposes of illustrating the exemplary embodiments disclosed herein and not for the purposes of limiting the same.

FIG. 4 illustrates a top view of an embodiment of an energy absorbing assembly comprising the foam stage of FIG. 1 and the thermoplastic stage of FIG. 2.

FIG. 5 illustrates a cross-sectional side view of an embodiment of an energy absorbing assembly comprising the foam stage of FIG. 1 and the thermoplastic stage of FIG. 2.

DETAILED DESCRIPTION

Figure 1:
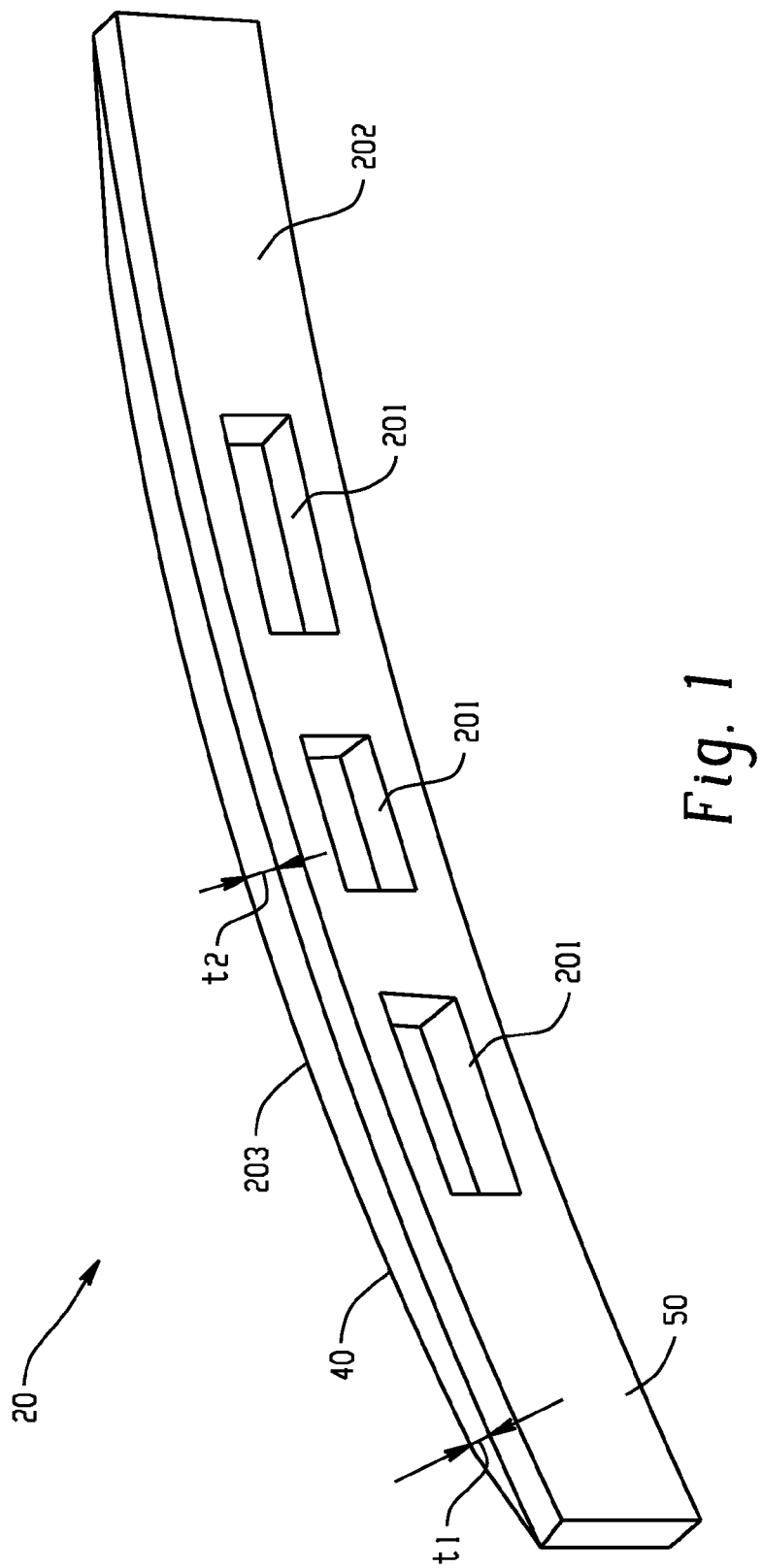
FIG. 1 illustrates an embodiment of a foam stage of an energy absorbing assembly.

Disclosed herein, in various embodiments, are energy absorbing assemblies which can be used in conjunction with other vehicle components (e.g., a bumper beam), to, for example, minimize the damage and/or injury suffered to a pedestrian and/or a vehicle during an impact. The energy absorbing assembly can comprise a foam stage attached to a thermoplastic stage, where the thermoplastic stage can comprise a frame with crush lobes protruding from the frame. The foam stage can comprise a first surface and a second surface, where the second surface of the foam stage can comprise recesses that can be configured to mate with the crush lobes protruding from the frame. The energy absorbing assembly can be configured to absorb energy for both pedestrian impacts and vehicle damageability. For example, the energy absorbing assembly can absorb energy at energy levels of, for example, 1,000 Joules (J) at speeds of 4 kph to 10 kph for pedestrian impacts and can absorb energy at energy levels of, for example, 5,000 J to 6,000 J at 10 kph to 15 kph for vehicle damageability. Such a design can meet overall system requirements of lower weight and cost without a significant increase in packaging space or a compromise in design freedom. Accordingly, provided herein are energy absorbing assemblies for use in a vehicle, for example, to reduce injuries (e.g., to occupant(s), pedestrian(s), etc.) as well as to reduce vehicle damage as a result of an impact.

Although the energy absorbing assemblies disclosed herein can be used in any location in a vehicle, they are generally intended for use at the front portion of a vehicle, in front of the bumper beam (e.g., in the portion of the vehicle where the engine, radiator, etc. are generally located) to protect the components located within the body in white (BIW) from damage upon impact. Bumper beams are provided generally to reduce and/or eliminate the damage to vehicle components located behind the bumper beam such as the engine components and radiator. Generally, the energy absorbing assemblies described herein can be located in the front bumper and/or rear bumper of a vehicle and can be attached to a bumper beam (e.g., metal, plastic, etc.) that is attached to the BIW to serve as protection to the vehicle during an impact. For example, the energy absorbing assemblies can be attached to a bumper beam which is attached to the vehicle rails and/or cross members. The foam stage of the energy absorbing assembly can be located in front of the thermoplastic stage and the bumper beam to, e.g., reduce the injury to a pedestrian upon an impact. Decorative fascia can be disposed over the foam stage.

During high energy levels of low speed impacts, energy absorbing assemblies attempt to reduce vehicle damage by absorbing impact energy and thus, intrusion into and damage of vehicle components while not exceeding a rail load limit of the vehicle (e.g., the point at which the BIW will begin to deform). In addition, some energy absorbing assemblies attempt to reduce pedestrian injury as a result of an impact during low energy levels of a low speed impact. The energy absorbing assemblies described herein comprising a foam stage and a thermoplastic stage can meet the lower leg impact Phase II target requirements (e.g., low energy level) and the vehicle damageability 5 mph requirements set forth by the Federal Motor Vehicle Safety Standards (FMVSS) (e.g., high energy level).

Automotive manufacturers continually desire a reduction in overall mass of the energy absorbing assemblies, which generally correlates with a reduction in cost of making the energy absorbing assemblies. Foam energy absorbing assemblies can be lower in cost and weight, but will not have as high energy absorption as thermoplastic energy absorbing assemblies, while all thermoplastic energy absorbing assemblies will have a higher cost. The energy absorbing assemblies described herein comprising a foam stage and a thermoplastic stage can offer acceptable energy absorption, while at the same time not significantly increasing either cost or weight of the energy absorbing assembly. For example, a greater than or equal to 20% reduction in weight as compared to a thermoplastic energy absorbing assembly can be achieved with the use of an energy absorbing assembly comprising a foam stage and a thermoplastic stage, specifically, greater than or equal to 25%, more specifically, greater than or equal to 30%, and even more specifically, greater than or equal to 35%.

The foam stage of the energy absorbing assembly can be designed to absorb energy and deform during impact with a pedestrian, while the thermoplastic stage comprising crush lobes protruding from a frame can be designed to plastically deform and absorb energy in vehicle to vehicle impacts, for example, at speeds less than or equal to 16 kph (9 mph), specifically, less than or equal to 8 kph (5 mph) and can also absorb energy of 4000 J to 6000 J (e.g., during an Allianz impact test), and also can provide support for the foam stage. Generally, the bumper beam to which the energy absorbing assembly is attached can provide support to the energy absorbing assembly and can also serve as a stiff member that elastically deforms and absorbs energy during impacts (e.g., pendulum and barrier impacts).

The energy absorbing assemblies described herein can meet and/or exceed requirements set forth for low speed crashes, e.g., 49 C.F.R. 581 and the Insurance Institute for Highway Safety (IIHS) for damageability mitigation in a 10 kph collision as well as meeting and/or exceeding pedestrian impact regulatory requirements set forth by various regulatory agencies including, e.g., European Enhanced Vehicle-safety Committee (EEVC), Association des Constructeurs européens d'Automobiles (ACEA, Phase II), and Global Technical Regulations (GTR).

The energy absorbing assemblies disclosed herein can generally comprise a foam stage having a first surface and a second surface, wherein the second surface comprises a recess and a thermoplastic stage comprising a frame and crush lobes. The crush lobes can extend from the frame of the thermoplastic stage into the recess.

Exemplary characteristics of the energy absorbing assembly include high toughness/ductility, thermal stability (e.g., −30° C. to 60° C.), high energy absorption efficiency, a good modulus-to-elongation ratio, and recyclability, among others, wherein "high" and "good" are intended to mean that the characteristic at least meets current vehicle safety regulations and requirements for the given component/element.

The thermoplastic stage comprising a frame and crush lobes protruding from the frame can comprise any thermoplastic material or combination of thermoplastic materials that can be formed into the desired shape and provide the desired properties. Exemplary materials include thermoplastic materials as well as combinations of thermoplastic materials with elastomeric materials, and/or thermoset materials. Possible thermoplastic materials include polybutylene terephthalate (PBT); acrylonitrile-butadiene-styrene (ABS); polycarbonate (LEXAN* and LEXAN* EXL resins, commercially available from SABIC Innovative Plastics); polycarbonate/PBT blends; polycarbonate/ABS blends; copolycarbonate-polyesters; acrylic-styrene-acrylonitrile (ASA); acrylonitrile-(ethylene-polypropylene diamine modified)-styrene (AES); phenylene ether resins; blends of polyphenylene ether/polyamide (NORYL GTX* resins, commercially available from SABIC Innovative Plastics); blends of polycarbonate/polyethylene terephthalate (PET)/PBT; polybutylene terephthalate and impact modifier (XENOY* resins, commercially available from SABIC Innovative Plastics); polyamides; phenylene sulfide resins; polyvinyl chloride PVC; high impact polystyrene (HIPS); low/high density polyethylene (L/HDPE); polypropylene (PP); expanded polypropylene (EPP); polyethylene and fiber composites; polypropylene and fiber composites (AZDEL Superlite* sheets, commercially available from Azdel, Inc.); long fiber reinforced thermoplastics (VERTON* resins, commercially available from SABIC Innovative Plastics) and thermoplastic olefins (TPO), as well as combinations comprising at least one of the foregoing.

An exemplary filled resin is STAMAX* resin, which is a long glass fiber filled polypropylene resin also commercially available from SABIC Innovative Plastics. Some possible reinforcing materials include fibers, such as glass, carbon, and so forth, as well as combinations comprising at least one of the foregoing; e.g., long glass fibers and/or long carbon fiber reinforced resins. The thermoplastic stage can also be formed from combinations comprising at least one of any of the above-described materials. For example, in some embodiments, the same material can be used to make each element of the thermoplastic stage (e.g. the frame and the crush lobes). In other embodiments, different materials can be used to make the various elements of the energy absorber system (e.g., one material can be used to make the frame and a different material can be used to make the crush lobes). It is contemplated that any combination of materials can be used to, e.g., enhance crush characteristics, reduce damageability, etc.

The thermoplastic stage of the energy absorbing assembly can be manufactured utilizing various molding processes (e.g., injection molding, thermoforming, extrusion, etc.) to provide a single piece assembly (e.g., an integrally formed frame and crush lobe(s)).

In an embodiment, the foam stage can provide energy absorption during low energy level impacts. The foam stage can be formed from a foam comprising a variety of polymers, including, but not limited to, polyphosphazenes, poly(vinyl alcohols), polyamides, polyester amides, poly(amino acid)s, polyanhydrides, polycarbonates, polyacrylates, polyalkylenes, polyacrylamides, polyalkylene glycols, polyalkylene oxides, polyalkylene terephthalates, polyortho esters, polyvinyl ethers, polyvinyl esters, polyvinyl halides, polyesters, polylactides, polyglycolides, polysiloxanes, polyurethanes, polyethers, polyether amides, polyether esters, poly(methyl methacrylate), poly(ethyl methacrylate), poly(butyl methacrylate), poly(isobutyl methacrylate), poly(hexyl methacrylate), poly(isodecyl methacrylate), poly(lauryl methacrylate), poly(phenyl methacrylate), poly(methyl acrylate), poly(isopropyl acrylate), poly(isobutyl acrylate) and poly(octadecyl acrylate), polystyrene, polypropylene (PP), expanded polypropylene (EPP), polyvinyl phenol, polyvinylpyrrolidone, chlorinated polybutylene, poly(octadecyl vinyl ether), ethylene vinyl acetate, (expanded) polyethylene (EPE), poly(ethylene oxide)-poly(ethylene terephthalate), polyethylene/nylon (graft copolymer), polycaprolactones-polyamide (block copolymer), poly(caprolactone) dimethacrylate-n-butyl acrylate, poly(norbornyl-polyhedral oligomeric silsequioxane), polyurethane, polystyrene, polyvinylchloride, urethane/butadiene copolymers, polyurethane block copolymers, styrene-butadiene-styrene block copolymers, as well as combinations comprising at least one of the foregoing. The foam stage can also be formed from any of the materials listed with respect to the thermoplastic stage as well as combinations comprising at least one of the foregoing. For example, the foam stage can comprise a polypropylene/expanded polypropylene/polystyrene copolymer. Alternatively, the foam stage can comprise a copolymer of polyethylene and polystyrene.

In an embodiment, the foam can be a closed-cell foam or an open-cell foam (where open and closed refer to the determination of the open-cell volume percent content in the polymeric cellular material as measured according to ASTM D6226-05) or a combination thereof. Accordingly the foam stage of the energy absorbing assemblies described herein can comprise several layers of foam with varying densities (e.g., can comprise both closed cell foam and open cell foam), where the density can increase as a function of the distance from a first surface to a second surface of the foam stage. In other words, the foam stage can have a variable density (e.g., increase or decrease) from the first surface to the second surface.

Alternatively, or in addition, the foam stage can comprise a syntactic foam, e.g., a foam including hollow spheres embedded in a matrix comprising a polymer such as previously described. Syntactic foams are composite materials synthesized by filling a metal, polymer, or ceramic matrix with hollow particles called microballoons. The presence of hollow particles results in lower density, higher strength, and a lower thermal expansion coefficient. Tailorability is one of the biggest advantages of these materials. The matrix can be selected from any metal, polymer, or ceramic material. Examples of microballoons include cenospheres, glass microspheres, carbon microballoons, and polymer microballoons. Instead of microballoons, other fillers such as titanium dioxide, barium sulfate, silicon dioxide, silicone spheres, or microspheres (e.g., TOSPEARL*), polymethylmethacrylates particles, or the like, or a combination comprising at least one of the foregoing.

The compressive properties of syntactic foams primarily depend on the properties of microballoons, whereas the tensile properties depend on the matrix material that holds the microballoons together. There are several methods of adjusting the properties of the syntactic foams. The first method is to change the volume fraction of microballoon in the syntactic foam structure. The second method is to use microballoons of different wall thickness. In general, the compressive strength of the material is proportional to its density.

Glass microspheres can be made by heating tiny droplets of dissolved water glass in a process known as ultrasonic spray pyrolysis. Microspheres are also used in composite to fill polymer resins for specific characteristics such as weight, sandability, and sealing surfaces.

The spheres in the syntactic foam, which can be formed from glass, ceramic, polymers, and combinations comprising at least one of the foregoing, can have a diameter of 100 nanometers (nm) to 5 millimeters (mm), specifically, 500 nm to 1,000 nm, more specifically, 1 micrometer (µm) to 300 µm, and even more specifically, 10 µm to 200 µm. Variable densities of the syntactic foam can be attained by filling a mold with spheres of varying diameter and with molten thermoplastic material. The density of the foam can also be varied by varying the closed-cell fraction of the foam. Accordingly, the foam stage can comprise a layer of syntactic foam, where the syntactic foam has a continuous density throughout or has a varying density as described. Optionally, the foam stage can comprise several layers of foam. For example, the foam stage can comprise two different foams, e.g., the first surface of the foam stage can comprise a foam having a first foam density and the second surface of the foam stage can comprise a second foam having a second, different foam density. In such an embodiment, the first surface and second surface of the foam stage can be operably coupled with one another.

As described and used herein, operably coupled refers to the joining of two members directly or indirectly to one another. Such joining may be stationary in nature or moveable in nature. Such joining can be achieved with just the two members or with the two members and any additional intermediate member being integrally formed as a single unitary body with one another or with the two members or the two members and any additional members being attached to one another. Such joining may be permanent in nature or may be removable or releasable in nature.

For example, the foam stage can comprise a polypropylene/expanded polypropylene blend and/or copolymer, which can vary in density, thus enabling tuning of the energy absorbing assembly depending upon the requirements of the assembly, e.g., for given packaging space and performance requirements. The density of the foam stage can be increased in sections of the foam stage that will be subject to the greatest impact and decreased in sections of the foam stage that will not be subject to as great an impact.

The overall size, e.g., the specific dimensions of the energy absorbing assembly will depend upon its location in the vehicle and its function, as well as the particular vehicle for which it is intended. For example, the length (l), height (h), and width (w) of the energy absorbing assembly, will depend upon the amount of space available in the desired location of use as well as the needed energy absorption. The depth and wall thickness of the various components of the energy absorbing assembly will also depend upon the available space, desired stiffness, and the materials (or combination of materials) employed. The depth "d" of the foam stage and the thermoplastic stage is generally bounded by the distance between the fascia and the bumper beam.

The energy absorbing assembly can be produced by several methods such as molding, forming, or any other suitable manufacturing technique. For example, energy absorber and/or crush lobes can be formed by a process selected from injection molding, thermoforming, extrusion, or combinations comprising at least one of the foregoing.

Likewise, the foam stage can be formed by a mechanical forming process (e.g., polyurethane foams) or by the use of blowing agents (e.g., polyolefin foams). Blow agents can be classified as physical blowing agents or chemical blowing agents. When using a physical blowing agent, foaming can be achieved by allowing the expansion of gases that are dissolved or suspended in a molten polymer by reducing the pressure. When using a chemical foaming agent, the cell structure can be formed by chemical decomposition of a blowing agent. In a mechanical foaming process, the foam structure can be achieved by mechanically trapping the gasses in the structure, e.g., air can be trapped through rigorous whipping of polymer slurry using appropriate mixers. The foam stage can be formed from any of the processes, as well as combinations comprising at least one of the foregoing.

When using a physical blowing agent, the foam stage can be formed by immersing a polymeric foaming solution with foaming gas under high pressure at a temperature higher than the glass transition temperature of the polymer or its blend to form a homogeneous system. The pressure is then rapidly released to generate an unstable over-saturated system so that the gas dissolved in the polymeric foaming solution can nucleate and separate bubbles out until it attains equilibrium between the bubble pressure, strength of the polymeric material, and finally the polymeric solution solidifies to obtain the polymeric foam. In one embodiment, carbon dioxide ($CO_2$) or nitrogen ($N_2$) gas can be used as the foaming gas. Since homogeneous nucleation generally requires higher energy and since it has fewer nucleating sites than heterogeneous nucleation, which results in a larger cell size in the resultant foam, the nucleating energy can be reduced by adding a nucleating agent to increase the nucleating sites during the foaming process and thus provide a heterogeneous nucleation for the foaming gas contained in the polymeric solution. The various properties (e.g., physical properties such as diameter) of the foam used in the energy absorbing assemblies described herein can be influenced by the kinds of nucleating agent used, and/or the temperature/pressure profile used to make the foam, and/or the foaming gas used. Foams can be formed by an extruding-forming process, in which the polymer is heated and melted; a nucleating agent and a foaming agent are added into the molten polymer or polymer blend; the mixture is blended into a polymeric foaming solution; and the polymeric foaming solution is extruded and foamed at an appropriate temperature to form the foam.

Examples of physical blowing agents are those comprising hydrogen atom-containing components, which can be used alone or as mixtures with each other or with another type of blowing agent such as water or azo compounds. These blowing agents can be selected from a broad range of materials, including hydrocarbons, ethers, esters, and partially halogenated hydrocarbons, ethers and esters, and the like. Physical blowing agents generally have a boiling point of about −50° C. to about 100° C., and specifically about −25° C. to about 50° C. Among the usable hydrogen-containing blowing agents are the HCFC's (halo chlorofluorocarbons) such as 1,1-dichloro-1-fluoroethane, 1,1-dichloro-2,2,2-trifluoroethane, monochlorodifluoromethane, and 1-chloro-1,1-difluoroethane; the HFCs (halo fluorocarbons) such as 1,1,1,3,3,3-hexafluoropropane, 2,2,4,4-tetrafluorobutane, 1,1,1,3,3,3-hexafluoro-2-methylpropane, 1,1,1,3,3-pentafluoropropane, 1,1,1,2,2-pentafluoropropane, 1,1,1,2,3-pentafluoropropane, 1,1,2,3,3-pentafluoropropane, 1,1,2,2,3-pentafluoropropane, 1,1,1,3,3,4-hexafluorobutane, 1,1,1,3,3-pentafluorobutane, 1,1,1,4,4,4-hexafluorobutane, 1,1,1,4,4-pentafluorobutane, 1,1,2,2,3,3-hexafluoropropane, 1,1,1,2,3,3-hexafluoropropane, 1,1-difluoroethane, 1,1,1,2-tetrafluoroethane, and pentafluoroethane; the HFE's (halo fluoroethers) such as methyl-1,1,1-trifluoroethylether and difluoromethyl-1,1,1-trifluoroethylether; and the hydrocarbons such as n-pentane, isopentane, and cyclopentane, and combinations comprising at least one of the foregoing.

Included among the normally gaseous and liquid blowing agents are the halogen derivatives of methane and ethane, such as methyl fluoride, methyl chloride, difluoromethane, methylene chloride, perfluoromethane, trichloromethane, difluoro-chloromethane, dichlorofluoromethane, dichlorodifluoromethane (CFC-12), trifluorochloromethane, trichloromonofluoromethane (CFC-11), ethyl fluoride, ethyl chloride, 2,2,2-trifluoro-1,1-dichloroethane (HCFC-123), 1,1,1-trichloroethane, difluorotetrachloroethane, 1,1-dichloro-1-fluoroethane (HCFC-141b), 1,1-difluoro-1-chloroethane (HCFC-142b), dichlorotetrafluoroethane (CFC-114), chlorotrifluoroethane, trichlorotrifluoroethane (CFC-113), 1-chloro-1,2,2,2-tetrafluoroethane (HCFC-124), 1,1-difluoroethane (HFC-152a), 1,1,1-trifluoroethane (HFC-143a), 1,1,1,2-tetrafluoroethane (HFC-134a), perfluoroethane, pentafluoroethane, 2,2-difluoropropane, 1,1,1-trifluoropropane, perfluoropropane, dichloropropane, difluoropropane, chloroheptafluoropropane, dichlorohexafluoropropane, perfluorobutane, perfluorocyclobutane, sulfur-hexafluoride, and combinations comprising at least one of the foregoing.

Other normally gaseous and liquid blowing agents that may be employed are hydrocarbons and other organic compounds such as acetylene, ammonia, butadiene, butane, butene, isobutane, isobutylene, dimethylamine, propane, dimethylpropane, ethane, ethylamine, methane, monomethylamine, trimethylamine, pentane, cyclopentane, hexane, propane, propylene, alcohols, ethers, ketones, and the like. Inert gases and compounds, such as carbon dioxide, nitrogen, argon, neon, or helium, may be used as blowing agents with satisfactory results. A physical blowing agent may be used to produce foam directly out of the extrusion die. The composition may optionally include chemical foaming agents for further expansion. Exemplary physical blowing agents are carbon dioxide and nitrogen.

Solid, chemical blowing agents, which decompose at elevated temperatures to form gases, may be used. In general, the decomposable foaming agent will have a decomposition temperature (with the resulting liberation of gaseous material) of about 130° C. to about 350° C. Representative chemical blowing agents include azodicarbonamide, p,p'-oxybis (benzene)sulfonyl hydrazide, p-toluene sulfonyl hydrazide, p-toluene sulfonyl semicarbazide, 5-phenyltetrazole, ethyl-5-phenyltetrazole, dinitroso pentamethylenetetramine, and other azo, N-nitroso, carbonate and sulfonyl hydrazides as well as various acid/bicarbonate compounds, which decompose when heated.

In one embodiment, the cells of the polymeric foams can have a cell size of 0.1 micrometers to 100 micrometers, specifically 1 micrometer to 80 micrometers, and more specifically 5 to 50 micrometers.

Methods of making energy absorbing assemblies are also contemplated. For example, a method of making an energy absorbing assembly can comprise forming a foam stage having a first surface and a second surface, wherein the second surface comprises recesses, forming a thermoplastic stage having a frame and crush lobes protruding from the frame; and engaging the recesses and the crush lobes to form the energy absorbing assembly.

A more complete understanding of the components, processes, and apparatuses disclosed herein can be obtained by reference to the accompanying drawings. These figures (also referred to herein as "FIG.") are merely schematic representations based on convenience and the ease of demonstrating the present disclosure, and are, therefore, not intended to indicate relative size and dimensions of the devices or components thereof and/or to define or limit the scope of the exemplary embodiments. Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function.

Figure 2:
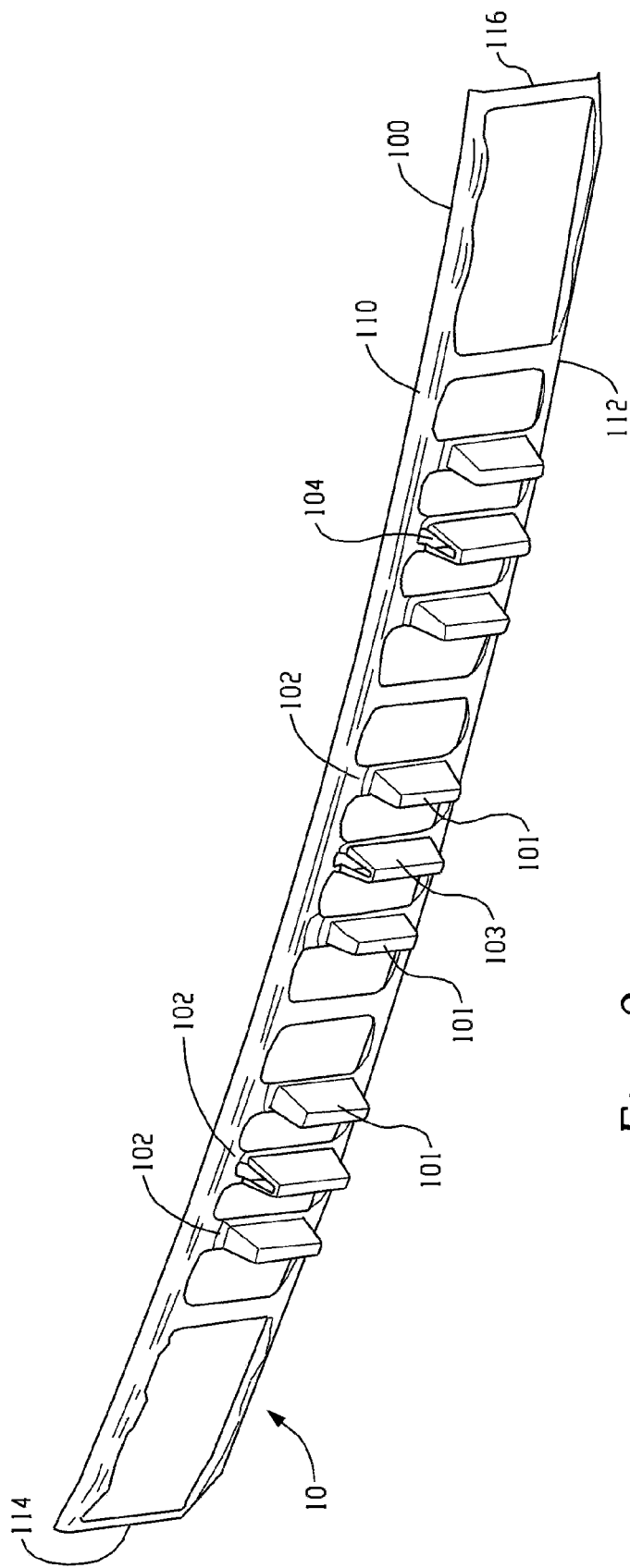
FIG. 2 illustrates an embodiment of a thermoplastic stage of an energy absorbing assembly.
Figure 3:
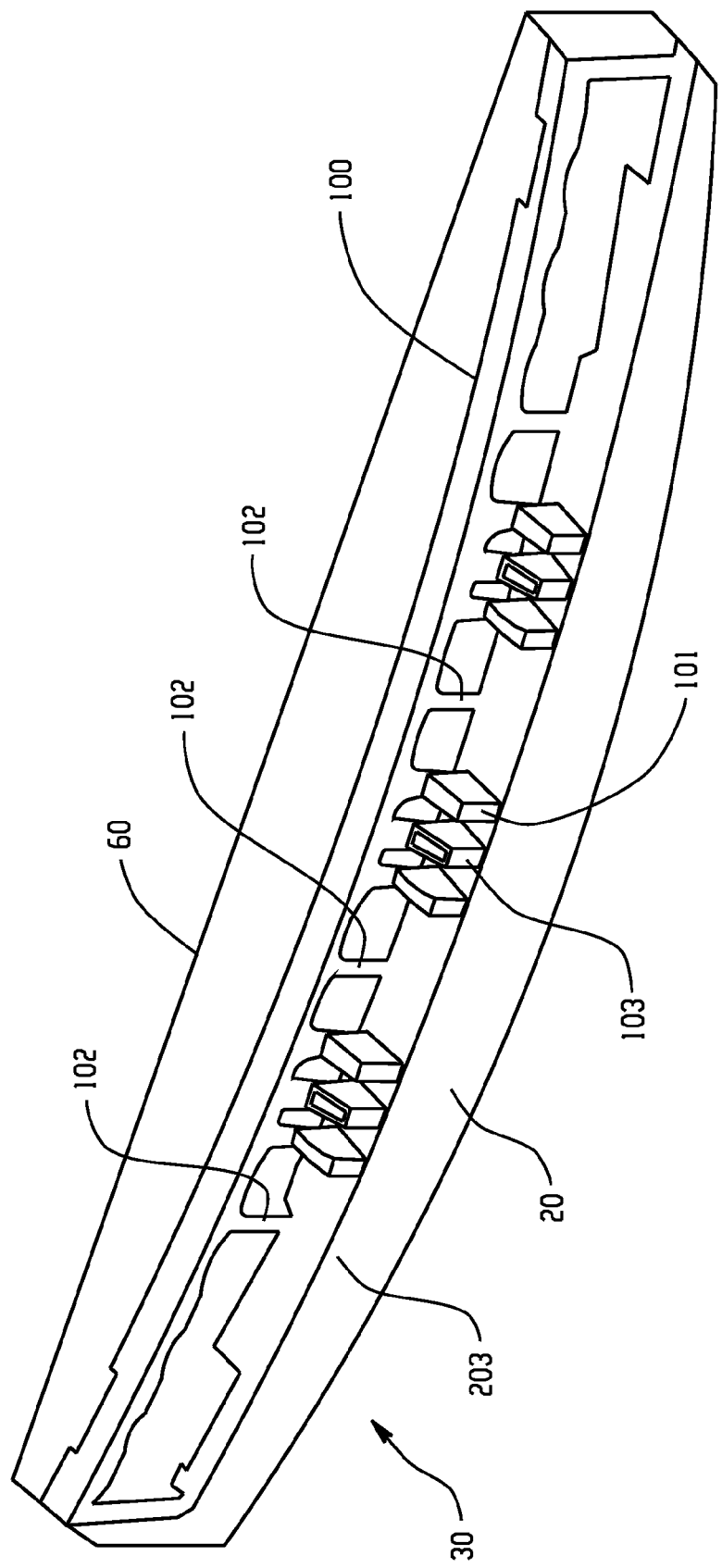
FIG. 3 illustrates a top left perspective view of an embodiment of an energy absorbing assembly comprising the foam stage of FIG. 1 and the thermoplastic stage of FIG. 2.

FIG. 1 illustrates an embodiment of a foam stage 20 for an energy absorbing assembly and FIG. 2 illustrates an embodiment of a thermoplastic stage 10 for an energy absorbing assembly, while FIGS. 3, 4, and 5 illustrate various configurations of an assembled foam stage 20 and thermoplastic stage 10 to create an energy absorbing assembly 30. As is displayed in FIG. 1, the foam stage 20 can comprise a first surface 203 and a second surface 202, where the first surface 203 is generally oriented toward a fascia side 40 of the assembly and the second surface 202 is generally oriented toward a bumper side 50 of the energy absorbing assembly 30. The second surface 202 can comprise recesses 201, which are configured to mate with crush lobes 101 on the thermoplastic stage 10 (e.g., FIG. 2). The shape and various dimensions (e.g., length, width, thickness, and depth) of the recesses 201 can vary depending upon the shape and dimensions of the crush lobes 101. However, the shape and dimensions of the recesses 201 should be designed so that the crush lobes 101 illustrated in FIG. 2 are able to fit within the recesses 201, optionally, leaving a gap between the recess 201 and the crush lobes 101 to accommodate for thermal expansion of the crush lobes 101 and/or the foam stage 20. The first surface 203 of the foam stage 20 can have a curved shape or a flat shape extending across the length of the foam stage 20. For example, as illustrated in FIG. 1, the first surface 203 can have a curved shape such that the first surface 203 has a thickness, $t_1$, that increases from the ends of the foam stage 20 to a center of the foam stage, such that the center of the foam stage 20 has a greater thickness, $t_2$. If the foam stage 20 has a first surface 203 that is flat, the thickness is constant from end to end of the foam stage 20.

FIG. 1 further demonstrates that the second surface 202 of the foam stage 20 can comprise a flat surface to enable it to engage with the thermoplastic stage 10 illustrated in FIG. 2 comprising crush lobes 101 and a frame 100. However, the second surface 202 of the foam stage 20 is not limited to a flat shape and can comprise any shape that will allow it to engage with the frame 100 of the thermoplastic stage 10 such that the crush lobes 101 of the thermoplastic stage 10 fit within the recesses 201 of the foam stage 20 and so that the foam stage 20 encases the thermoplastic stage 10 to form an energy absorbing assembly 30 as illustrated in FIGS. 3, 4, and 5.

Turning now to FIG. 2, the thermoplastic stage 10 is illustrated. The thermoplastic stage 10 can comprise a frame 100 and crush lobes 101 protruding from the frame 100. The frame 100 can comprise a generally rectangular shape with top sidewall 110 and bottom sidewall 112 connected by first end wall 114 and second end wall 116. The frame 100 shape is generally complimentary to the foam stage shape so that the two components of the energy absorbing assembly can mate with one another. The frame shape can comprise any shape that will provide the desired energy absorption and allow it to engage with the foam stage 20 to form the energy absorbing assembly. For example, the frame 100 and likewise, the foam stage 20, can have a shape including, but not limited to, rectangular, as illustrated, square, trapezoidal, cylindrical, and the like, and combinations comprising at least one of the foregoing. In one embodiment, the frame 100 can be a flanged frame (e.g., have a projecting rim around the edges of the frame). Additionally, the frame 100 can be a solid thermoplastic piece (i.e., with no open space between the top sidewall 110 and the bottom sidewall 112) with crush lobes protruding from various portions of the solid frame. Optionally, as shown in FIG. 2, disposed between the top sidewall 110 and the bottom sidewall 112 can be traverse ribs 102 to provide further strength and rigidity to the frame 100. Ribs 102 can further enable the energy absorbing assembly to absorb energy and decrease vehicle damageability upon an impact. Rib spacing can play a factor in wall stability and energy absorption. Ribs 102 can comprise a shape that can be triangular, truss, saw tooth, corrugated, quadratic curves, trapezoidal, hexagonal, pentagonal, octagonal, semi-circular, sinusoidal, lamellar, abs(sin), cycloid, and combinations comprising at least one of the foregoing.

Crush lobes 101 can protrude from the traverse ribs 102 as shown in FIG. 2. The crush lobes 101 can have any shape that will provide the desired energy absorption characteristics to the overall energy absorbing assembly. For example, the crush lobes 101 can have a shape that includes, but not limited to, a C-shaped cross section as illustrated in FIG. 2, a box-shaped cross section, a conical shaped cross section, a cylindrical shaped cross section, a conical shape, or a frusto-conical shape, and combinations comprising at least one of the foregoing. For example, the crush lobes 101 can have a shape such as conical or frusto-conical with a smaller cross section area at a surface of the crush lobe 101 facing the recesses 201 and a larger cross sectional area where the crush lobes 101 attach to the frame 100. The crush lobes 101 can be configured to engage with the recesses 201 of the foam stage 20 such that the crush lobes 101 fit within the recesses 201 of the foam stage 20. Multiple crush lobes 101 can fit within a single recess 201 or a single crush lobe 101 can fit within a single recess 201, depending on the desired design of the thermoplastic stage 10. For example, the recesses 201 in the foam stage 20 can be complimentary to the crush lobes 101, e.g., complimentary to sequential crush lobes so that, e.g., 1 to 20 crush lobes 101 can fit within recesses 201, specifically, greater than or equal to 1 crush lobe 101 can fit within the recess 201, more specifically, greater than or equal to 2, even more specifically, greater than or equal to 3, still more specifically, greater than or equal to 5, and yet more specifically, greater than or equal to 10. The crush lobes 101 can be hollow and/or solid. An example of a hollow crush lobe 103 is illustrated by FIGS. 2 and 3, where a hollow crush lobe 103 is illustrated between crush lobes 101. Since hollow crush lobe 103 can be surrounded on both sides by a crush lobe 101, hollow crush lobe 103 can optionally comprise an opening 104 in a surface of the hollow crush lobe 103 which can allow for complete crushing of hollow crush lobe 103. Opening 104 can allow hollow crush lobe 103 to crush inward, while crush lobes 101 can crush outward.

As illustrated in FIGS. 1 and 2, foam stage 20 having a first surface 203 on the fascia side 40 can be configured to engage and absorb energy during collision at low energy level impacts as herein described and also with a pedestrian and a second surface with recesses 201 can be configured to engage with a thermoplastic stage 10 having crush lobes 101 protruding from the thermoplastic stage 10.

The density of the foam stage 20 can vary from the first surface 203 to the second surface 202 or can be constant throughout the foam stage 20. If the density varies, the first surface 203 can be of a lower density than the second surface 202, thereby allowing for multiple stages of energy absorption upon an impact. In one embodiment, the foam stage 20 can comprise a copolymer comprising polypropylene/expanded polypropylene/polystyrene/expanded polystyrene/polystyrene/expanded polyethylene. Optionally, the expanded polystyrene can be a closed cell foam (e.g., having 75% to 100% closed cells). It is also contemplated that, depending on the desired stiffness, the number or thickness or both, of the ribs 102 and/or sidewalls 110, 112 present on the thermoplastic stage 10 can be increased or decreased. Likewise, the depth of the recesses 201 in the foam stage 20 and the crush lobe 101 size in the thermoplastic stage 10 can be tuned to optimize cost and/or weight.

Turning now to FIGS. 3, 4, and 5, various illustrations of the energy absorbing assembly 30 comprising the foam stage 20 and the thermoplastic stage 10 are illustrated. FIG. 3 shows an isometric view of the foam stage 20 fitted over the crush lobes 101 and being operably disposed over the thermoplastic stage 10. Also illustrated in FIG. 3 is a bumper beam 60 to which the energy absorbing assembly 30 is attached. FIG. 4 shows an illustration of the energy absorbing assembly 30 where, as previously mentioned, the foam stage 20 can have a variable thickness over the length of the energy absorbing assembly 30, which can be configured to span the length of a vehicle bumper beam 60 (FIG. 3). FIG. 5 shows a cross section energy absorbing assembly 30, illustrating the complimentary nature of the recesses 201 in the second surface 202 of the foam stage 20 over the crush lobes 101.

Figure 7:
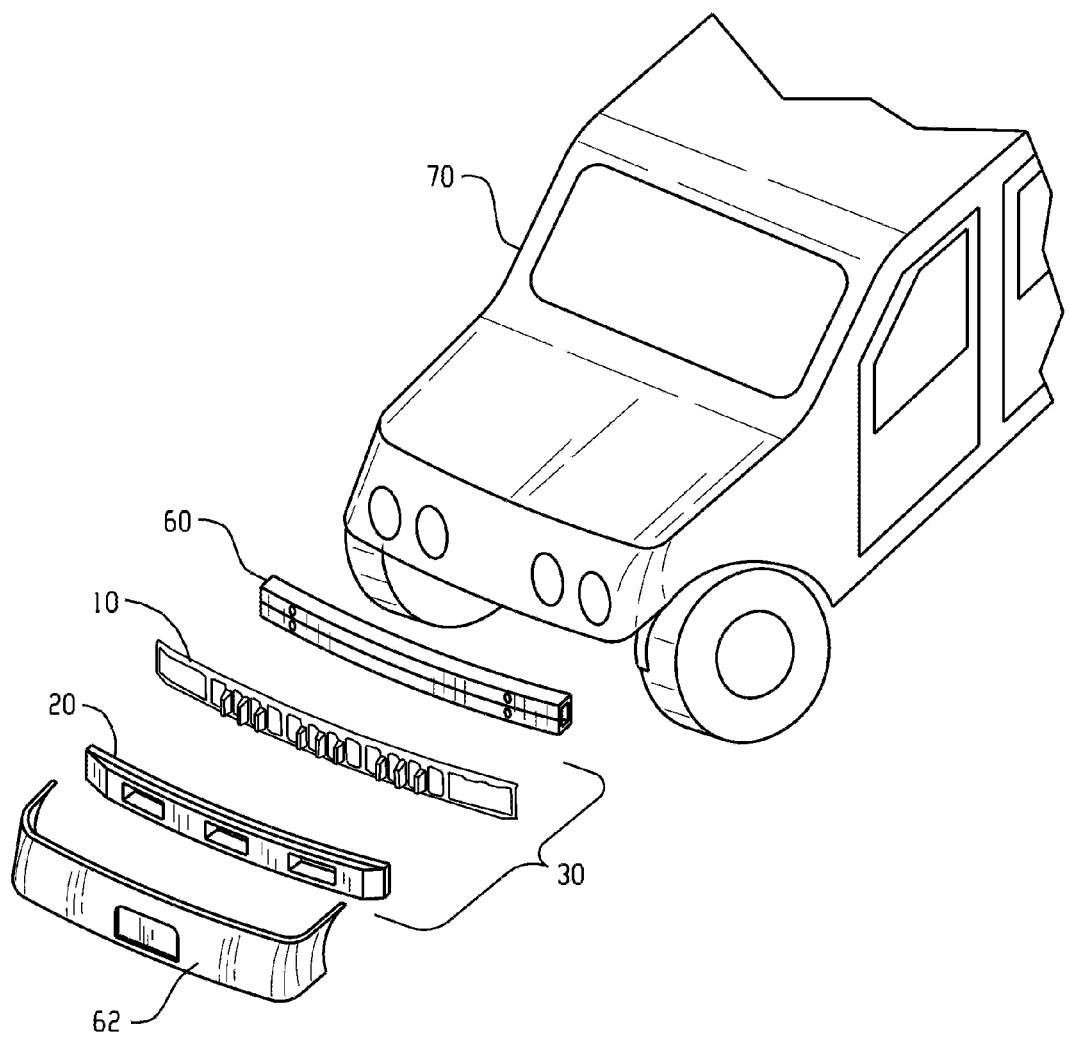
FIG. 7 illustrates a vehicle with an energy absorbing assembly comprising the foam stage of FIG. 1 and the thermoplastic stage of FIG. 2.

FIG. 7 illustrates a vehicle 70 with a bumper beam 60 having an energy absorbing assembly 30 comprising a foam stage 20 and a thermoplastic stage 10. A fascia 62 can be located over the energy absorbing assembly 30.

A method of making an energy absorbing assembly can comprise forming a foam stage having a first surface and a second surface, forming recesses in the foam stage, forming a thermoplastic stage having a frame and crush lobes protruding from the frame, and engaging the recesses and the crush lobes to form the energy absorbing assembly.

The energy absorber is further illustrated by the following non-limiting examples. It is noted that all of the examples were simulations unless specifically stated otherwise.

EXAMPLES

Example 1

Figure 6:
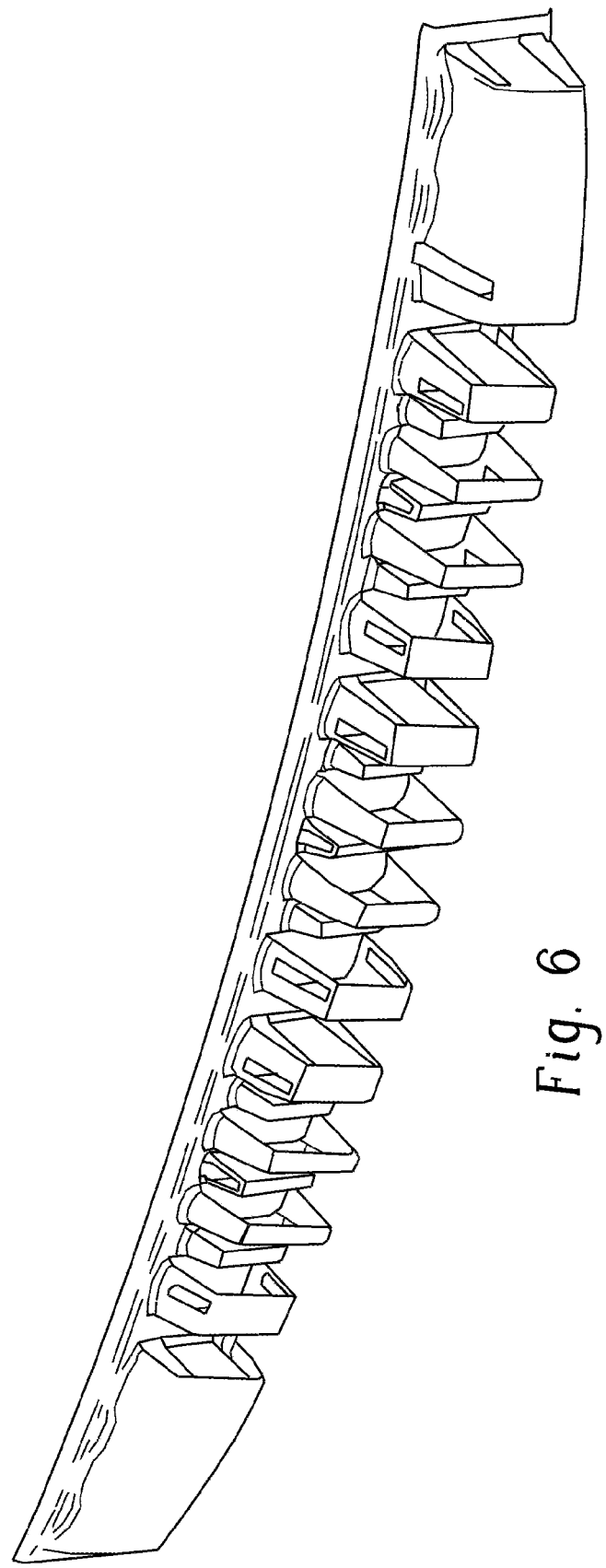
FIG. 6 shows an isometric, perspective view of an embodiment of an energy absorber.

An energy absorbing assembly having the design illustrated in FIG. 3 comprising the foam stage and thermoplastic stage is tested for various properties as described and compared to an all thermoplastic energy absorber with crush lobes having the design illustrated in FIG. 6. The foam stage comprises expanded polypropylene having a density of 30 grams per liter (g/L), while the thermoplastic stage comprises a blend of polycarbonate and polybutylene terephthalate (Xenoy*, commercially available from SABIC Innovative Plastics). The overall dimensions of the energy absorbing assembly are 1,200 mm in length, 120 mm in height, and a depth of 85 mm. A lower leg impact test according to the Euro New Car Assessment Program (NCAP) lower leg impact testing protocol simulates injuries that a pedestrian suffer upon an impact with soft tissue injuries to the knee joint or fractures to adjacent leg bones. These injuries typically occur early in a vehicle-to-pedestrian collision. The test device simulates the human lower leg, including the knee joint. The impact occurs at speeds up to 40 kph and occurs perpendicular to the plane of articulation of the knee and the angular movement of the knee joint at right angles to the axis of articulation is measured and reported in rotation degrees. Tibia deceleration (i.e., G-load) and knee shear displacement are also measured and reported. In general, a lower degree of rotation, a lower load, and a higher shear displacement indicate higher energy absorption efficiency.

An energy absorbing assembly having the design illustrated in FIG. 3 and an energy absorber having the design illustrated in FIG. 6 were tested for lower leg impact properties as described. Results are illustrated in Table 1 and FIG. 8, which is a plot of acceleration (measured in g's (which refers to the gravitational acceleration at the Earth's surface) versus time measured in seconds (s)) for Comparative Sample 1 (C1), (which is an energy absorber having the design illustrated in FIG. 6) and Sample 1, (which is an energy absorbing assembly having the design illustrated in FIG. 3). The mass of Sample 1 was approximately 0.75 kilograms (kg), while that for Comparative Sample 1 was approximately 1.1 kg. In Table 1, G-Load is measured in gs, Rotation is measured in degrees, and shear is measured in mm. The test occurred at Y=0, where Y refers to the impact location. In these tests, the impact location is in the center of the energy absorbing assembly at, for example, hollow crush lobe 103 (see e.g., FIG. 4). The overall length of the energy absorbing assembly is generally 1,000 millimeters (mm) (e.g., 500 mm on either side of Y=0).

TABLE 1

| | Lower Leg Impact at Y = 0 | | |
| --- | --- | --- | --- |
| | G-Load (g) | Rotation (degree) | Shear (mm) |
| Sample 1 | 152 | 14.9 | 2.4 |
| C1 | 159.5 | 15.2 | 2.1 |

Figure 8:
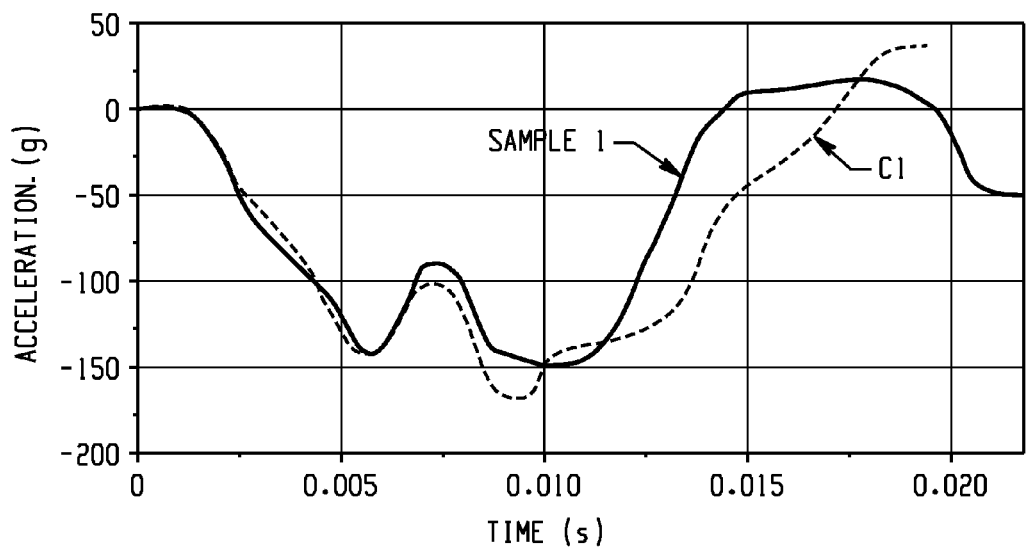
FIG. 8 displays an acceleration versus time curve comparing an energy absorbing assembly having the design illustrated in FIG. 3 and an energy absorber having the design illustrated in FIG. 6.

As illustrated in Table 1, Sample 1 demonstrates a lower deceleration (G-Load) at 152 g compared to C1 at 159.5 g, lower rotation degree of 14.9 for Sample 1 compared to 15.2 for C1, and higher knee shear displacement at 2.4 mm for Sample 1 compared to 2.1 mm for C1. FIG. 8 demonstrates that Sample 1 experiences a maximum G-Load in a shorter time than C1 and Sample 1 also plateaus and begins to decrease at an earlier time than C1. These results show that the energy absorbing assembly comprising a foam stage and a thermoplastic stage are more effective than energy absorbing designs made entirely of a thermoplastic in protecting pedestrians from lower leg impact.

Example 2

The efficiency of an energy absorbing assembly can be described as the amount of energy absorbed over a distance, or the amount of energy absorbed over a load. A highly efficient energy absorbing assembly absorbs a greater amount of energy over a shorter distance than an energy absorbing assembly having a low efficiency. High efficiency can be achieved by building load quickly to just under the load limit of the object sought to be protected (e.g. pedestrian leg, car rail, etc.) and maintaining that load constant until the impact energy has been dissipated.

The efficiency is tested according to FMVSS standards in a 5 mph barrier impact test where Sample 1 is installed on a 1,600 kilogram (kg) vehicle and compared to Comparative Sample 1. Results are shown in Table 2 and in FIG. 9. In Table 2, force is measured in kiloNewtons (kN) and displacement (e.g., stroke, intrusion) and Back of Beam displacement (BoB) are measured in mm BoB generally refers to a measurement of the amount of deflection at the back of a bumper beam.

TABLE 2

| | Barrier Impact at 5 mph (FMVSS) | | |
|---|---|---|---|
| | Force (kN) | Displacement (mm) | BoB (mm) |
| Sample 1 | 93 | 103 | 13 |
| C1 | 92 | 105 | 15 |

Figure 9:
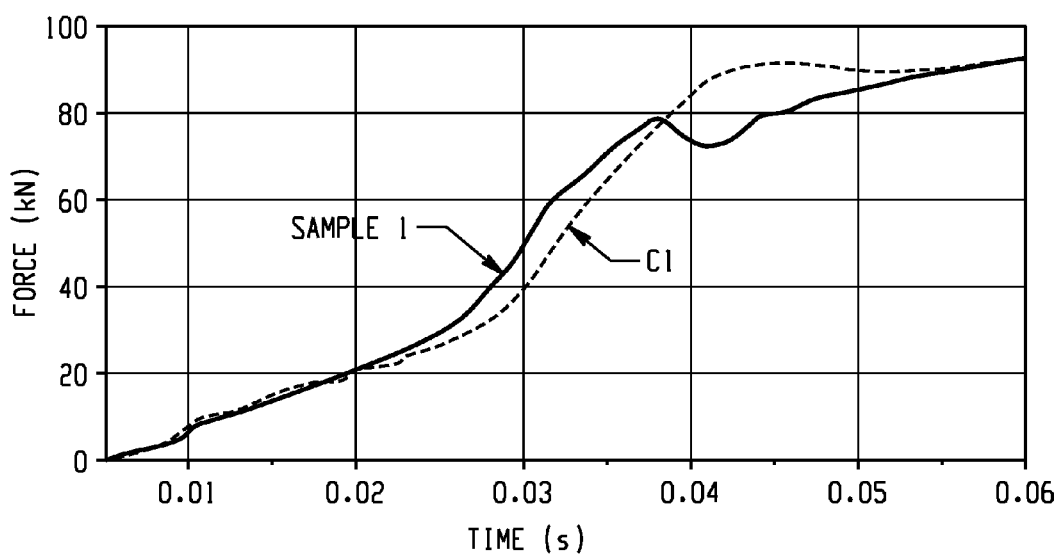
FIG. 9 displays a force versus time curve comparing the energy absorption at 5 miles per hour of an energy absorbing assembly having the design illustrated in FIG. 3 and an energy absorber having the design illustrated in FIG. 6.

Table 2 demonstrates that for nearly the same applied force, Sample 1 has a lower displacement, 103 mm versus 105 mm for C1, and a lower BoB value, 13 mm versus 15 mm for C1. FIG. 9 demonstrates a first stage peak of around 80 kN for Sample 1, which is associated with the foam stage at about 38 milliseconds (ms) followed by an increase in the load absorbed by the thermoplastic stage over a shorter stroke distance as compared to C1.

Figure 10:
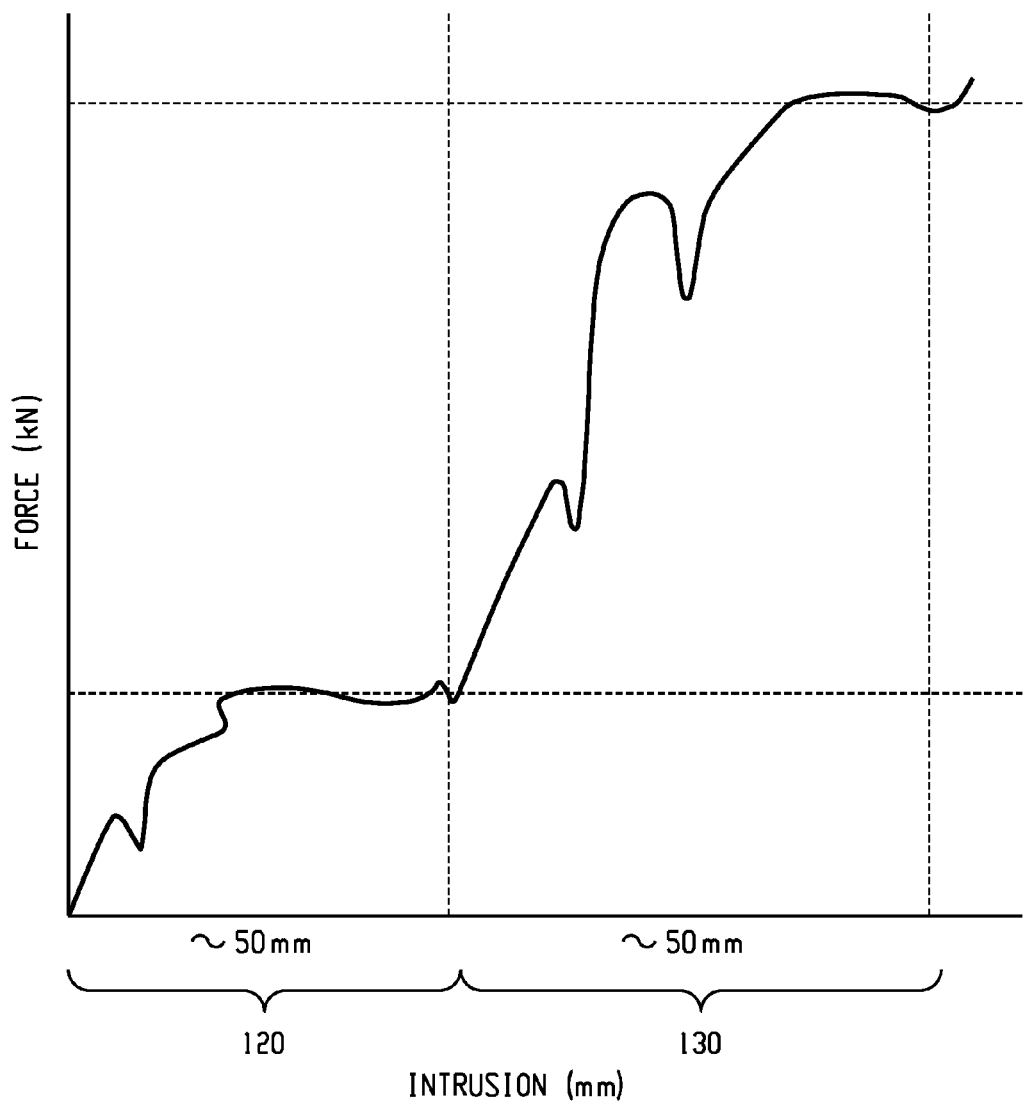
FIG. 10 displays a force versus deformation curve of an energy absorbing assembly having the design illustrated in FIG. 3.

FIG. 10 illustrates graphically the force measured in kN versus intrusion measured in mm for an energy absorbing assembly having the design illustrated in FIG. 3 for Stage 1 pedestrian impact 120 and Stage 2 damageability 130. As can be seen in FIG. 10, at intrusions of less than or equal to 50 mm, only the foam stage is engaged. At intrusions greater than 50 mm, the thermoplastic stage is engaged and will affect the vehicle damageability.

The results from both the lower leg impact tests and the barrier impact tests indicate that a reduction in the weight of the energy absorbing assembly can be achieved. Specifically, a less than or equal to 35% reduction in weight can be achieved with the use of an energy absorbing assembly comprising a foam stage and a thermoplastic stage, specifically, less than or equal to 30%, more specifically, less than or equal to 25%, and even more specifically, less than or equal to 20% as compared to an energy absorbing design such as that illustrated in FIG. 6. Such a reduction in weight can lead to savings in cost when comparing an energy absorbing design comprising a foam stage and a thermoplastic stage (e.g., such as that illustrated in FIG. 3) as compared to an energy absorber as illustrated in FIG. 6, when the material for the thermoplastic stage and the material for the design in FIG. 6 are the same.

In an embodiment, an energy absorbing assembly comprises: a foam stage having a first surface and a second surface, wherein the second surface comprises a recess; and a thermoplastic stage comprising a frame and crush lobes; wherein the crush lobes extend from the frame of the thermoplastic stage into the recess.

In another embodiment, a method of making an energy absorbing assembly comprises: forming a foam stage having a first surface and a second surface, wherein the second surface comprises recesses; forming a thermoplastic stage having a frame and crush lobes protruding from the frame; and engaging the recesses and the crush lobes to form the energy absorbing assembly.

In an embodiment, a vehicle comprises: an energy absorbing assembly, comprising a foam stage having a first surface and a second surface, wherein the second surface comprises a recess; and a thermoplastic stage comprising a frame and crush lobes; wherein the crush lobes extend from the frame of the thermoplastic stage into the recess; a fascia disposed over the first surface of the energy absorbing assembly; and a bumper beam, wherein the thermoplastic stage of the energy absorbing assembly is attached to the bumper beam.

In the various embodiments, (i) the foam stage comprises a foam selected from the group consisting of polypropylene, expanded polypropylene, polystyrene, polyethylene, polyurethane, copolymers of any of the foregoing, and combinations comprising at least one of the foregoing; and/or (ii) wherein the foam stage comprises a closed-cell foam; and/or (iii) the foam stage has a variable density; and/or (iv) the foam stage has an increasing density from the first surface to the second surface or wherein the foam stage has an increasing density from the second surface to the first surface; and/or (v) the frame of the thermoplastic stage further comprises traverse ribs disposed between longitudinal sides, wherein the crush lobes protrude from the traverse ribs; and/or (vi) the traverse ribs comprise a shape selected from the group consisting of triangular, truss, saw tooth, corrugated, quadratic curves, trapezoidal, hexagonal, pentagonal, octagonal, semicircular, sinusoidal, lamellar, abs(sin), cycloid, and combinations comprising at least one of the foregoing; and/or (vii) the crush lobes comprise a conical structure that diverges from a surface facing the frame to a surface facing the foam stage; and/or (viii) the frame of the thermoplastic stage comprises a flanged frame having a projecting rim disposed around an edge of the frame; and/or (ix) the crush lobes protrude from the flanged frame.

All ranges disclosed herein are inclusive of the endpoints, and the endpoints are independently combinable with each other (e.g., ranges of "up to 25 wt. %, or, more specifically, 5 wt. % to 20 wt. %", is inclusive of the endpoints and all intermediate values of the ranges of "5 wt. % to 25 wt. %," etc.). "Combination" is inclusive of blends, mixtures, alloys, reaction products, and the like. Furthermore, the terms "first," "second," and the like, herein do not denote any order, quantity, or importance, but rather are used to denote one element from another. The terms "a" and "an" and "the" herein do not denote a limitation of quantity, and are to be construed to cover both the singular and the plural, unless otherwise indicated herein or clearly contradicted by context. The suffix "(s)" as used herein is intended to include both the singular and the plural of the term that it modifies, thereby including one or more of that term (e.g., the film(s) includes one or more films). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications, variations, improvements, and substantial equivalents.

What is claimed is:

1. An energy absorbing assembly, comprising:
a foam stage having a first surface and a second surface, wherein the second surface comprises a recess; and
a thermoplastic stage comprising a frame and crush lobes, wherein the frame has longitudinal side above and below the crush lobes;
wherein the crush lobes extend from the frame of the thermoplastic stage into the recess such that the foam stage extends above the crush lobes, below the crush lobes, or both, and toward at least one of the longitudinal sides, wherein greater than or equal to two crush lobes fit within a single recess.

2. The energy absorbing assembly of claim 1, wherein the foam stage comprises a foam selected from the group consisting of polystyrene, polyethylene, polyurethane, copolymers of any of the foregoing, and combinations comprising at least one of the foregoing.

3. The energy absorbing assembly of claim 1, wherein the foam stage comprises a closed-cell foam.

4. The energy absorbing assembly of claim 1, wherein the foam stage has a variable density.

5. The energy absorbing assembly of claim 4, wherein the foam stage has an increasing density from the first surface to the second surface or wherein the foam stage has an increasing density from the second surface to the first surface.

6. The energy absorbing assembly of claim 1, wherein the crush lobes comprise a conical structure that diverges from a surface facing the frame to a surface facing the foam stage.

7. The energy absorbing assembly of claim 1, wherein the frame of the thermoplastic stage comprises a flanged frame having a projecting rim disposed around an edge of the frame.

8. The energy absorbing assembly of claim 7, wherein the crush lobes protrude from the flanged frame.

9. The energy absorbing assembly of claim 1, comprising a gap between the foam of the recess and the crush lobes.

10. The energy absorbing assembly of claim 1, wherein the recess encases the crush lobes.

11. A method of making an energy absorbing assembly, comprising:
forming a foam stage having a first surface and a second surface, wherein the second surface comprises recesses;
forming a thermoplastic stage having a frame and crush lobes protruding from the frame, wherein the frame has longitudinal side above and below the crush lobes; and
engaging the recesses and the crush lobes to form the energy absorbing assembly;
wherein the crush lobes extend from the frame of the thermoplastic stage into the recess such that the foam stage extends above the crush lobes, below the crush lobes, or both, and toward at least one of the longitudinal sides, and
wherein engaging the recesses and the crush lobes comprises inserting the crush lobes into the recesses.

12. The method of claim 11, wherein the energy absorbing assembly further comprises, wherein the foam stage comprises a foam selected from the group consisting of polystyrene, polyethylene, polyurethane, copolymers of any of the foregoing, and combinations comprising at least one of the foregoing.

13. The method of claim 11, wherein the foam stage of the energy absorbing assembly comprises a closed-cell foam.

14. The method of claim 11, wherein the foam stage of the energy absorbing assembly has a variable density.

15. The method of claim 14, wherein the foam stage of the energy absorbing assembly has an increasing density from the first surface to the second surface or wherein the foam stage has an increasing density from the second surface to the first surface.

16. The method of claim 11, further comprising:
forming the frame comprising traverse ribs disposed between longitudinal sides wherein the crush lobes protrude from the traverse ribs.

17. The method of claim 11, wherein there is a gap between the recess and the crush lobe.

* * * * *